July 13, 1926. 1,592,736
R. W. KENT
MOTOR VEHICLE ENGINE SUPPORT
Filed Nov. 28, 1925
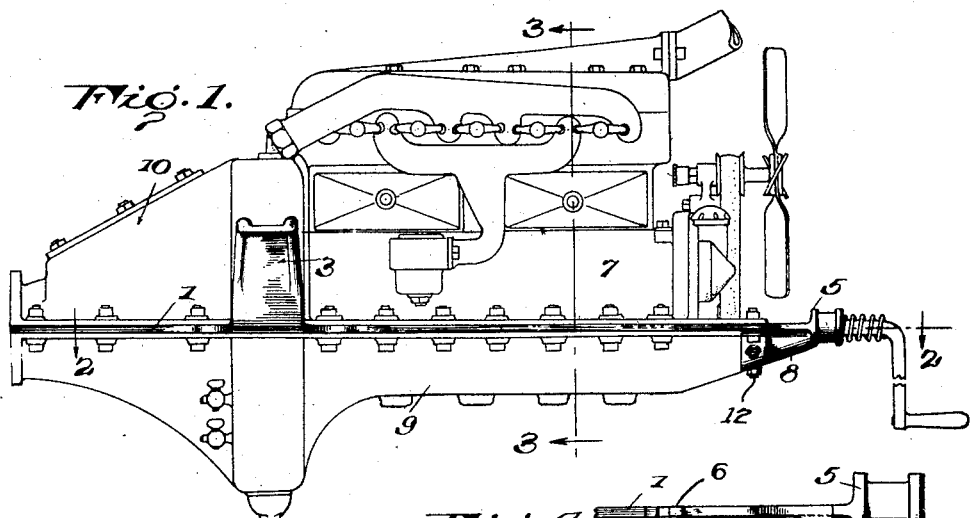
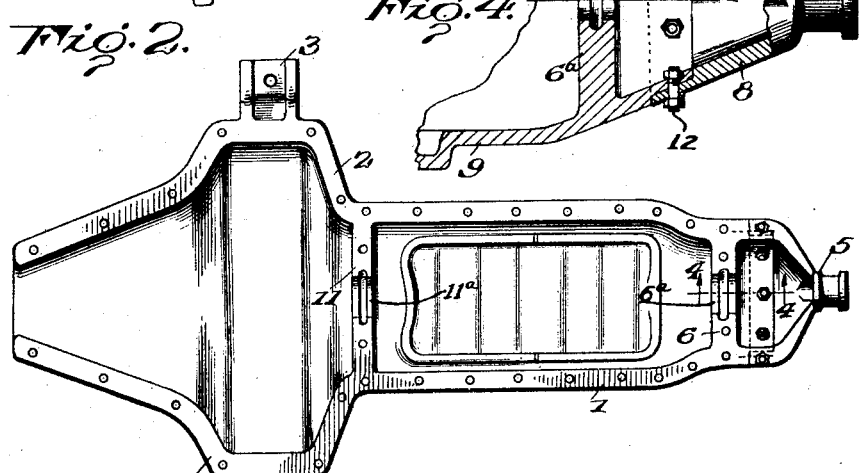
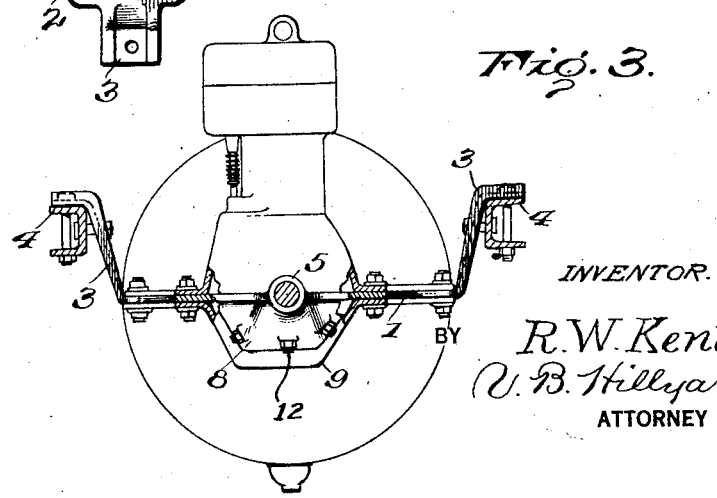
INVENTOR.
R. W. Kent,
U. B. Hillyard
ATTORNEY

Patented July 13, 1926. 1,592,736

UNITED STATES PATENT OFFICE.

REGINALD W. KENT, OF BURKBURNETT, TEXAS.

MOTOR-VEHICLE-ENGINE SUPPORT.

Application filed November 28, 1925. Serial No. 71,939.

The invention aims to facilitate repairs, adjustments and replacements of motor vehicle engines and to minimize the cost incident thereto and enable one skilled in the handling of tools to effect such work without having recourse to special appliances or the services of skilled help.

The invention contemplates a support attached directly to the frame of the chassis of a motor vehicle and disposed between the engine and the pan, or crank case, a set of bolts connecting the engine and pan to the support, the pan being readily removable to admit of ready access to the piston rod and main bearing for adjustment, repairs or any other purpose.

A further purpose of the invention is to obviate oil leakage and to dispense with the usual inspection pan at the bottom of the crank case as well as to materially strengthen the connection between the engine and the frame of the vehicle.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view illustrating the invention applied;

Figure 2 is a top plan view on the line 2—2 of Figure 1.

Figure 3 is a transverse section on the line 3—3 of Figure 1; and

Figure 4 is an enlarged sectional detail view on the line 4—4 of Figure 2.

Corresponding and like parts are referred to in the following description and designated in the several views of the drawings by like reference characters.

The invention is designed particularly for the Ford automobile and is disclosed in its application thereto, however it is not restricted to such use and may be adapted to other machines by making such changes as will readily suggest themselves to the skilled mechanic.

The support is designated generally by the numeral 1 and conforms in outline to the contour of the parts between which it is interposed, as shown most clearly in Figure 2. The support consists of an elongated metal frame tapering at opposite ends and widened near one end, as indicated at 2. Arms 3 project outwardly in opposite directions from the widened or enlarged portion 2 and extend upwardly and laterally and are bolted to the frame 4 of the vehicle or chassis. The front end of the frame 1 terminates in an extension 5 which is clamped or otherwise rigidly attached to the cross member of the frame 4. Arms 6 extend inwardly from the side members of the frame 4 in the rear of the tapered end and support the front end of the engine 7 which is bolted thereto. A crosspiece 8 curves downwardly between its ends and conforms to the front end of the pan or crank case 9 which is bolted thereto.

As shown the pan, or crank case 9 extends beneath the engine and the transmission housing and is bolted to the lower side of the support 1. This enables access to be easily had to the connecting rod and main bearings and to the transmission, if needs be, without necessitating the removal of the engine from the frame to make needed repairs and adjustments. The support 1 is held in place by a three point suspension, the two arms 3 and the extension 5, and the pan 9 may be removed at will without disturbing the support or the engine mounted thereon.

The transmission cover 10 is mounted upon the rear portion of the support 1 and is secured thereto by the same bolts which hold the bottom portion of the transmission housing thereto. The pan or crank case 9 is devoid of the usual inspection pan, thereby obviating oil leakage at the joint. The construction is such as to admit of a single gasket being used at each side of the support which insures a tight joint.

When it is required to gain access to the lower part of the engine for any purpose, as to adjust or replace connecting rod and main bearing, it is only necessary to remove the pan 9 which may be easily replaced, such work being quickly and easily effected without removal of the engine from the frame or the use of special appliances or skilled assistance thereby saving time and minimizing the cost.

The crank case 9 is provided at opposite ends with bearings $6^a$ and $11^a$, respectively, for the crank shaft and the arms 6 and 11 rest thereon. The meeting ends of the parts 8 and 9 are halved, the part 9 overlapping the part 8, and are secured by bolts 12.

What is claimed is:

1. A motor vehicle embodying the usual chassis, engine and crank case, a support secured directly to the frame of the chassis and disposed between the engine and the crank case and having such parts attached thereto, said support being oblong and having its ends tapered and widened adjacent one end and having inwardly disposed arms adjacent the opposite end.

2. A motor vehicle embodying the usual chassis, engine and crank case, a support secured directly to the frame of the chassis and disposed between the engine and the crank case and having such parts attached thereto, said support being oblong and having its ends tapered and widened adjacent one end and having inwardly disposed arms adjacent the opposite end, and having a downwardly curved crosspiece between the said inwardly disposed arms and the adjacent end of the frame.

3. A motor vehicle engine support of the character specified consisting of an oblong frame having its opposite ends tapered and widened adjacent one of the tapered ends and having outwardly, upwardly and laterally extending arms opposite the widened portion, and having inwardly disposed arms in the rear of the opposite tapered end, and a downwardly curved crosspiece between the said inner arms and the adjacent extremity of the frame.

In testimony whereof I affix my signature.

REGINALD W. KENT.